United States Patent
Kikuchi

(10) Patent No.: US 11,205,775 B2
(45) Date of Patent: Dec. 21, 2021

(54) NONAQUEOUS ELECTROLYTE ENERGY STORAGE DEVICE AND METHOD FOR PRODUCING THE SAME

(71) Applicant: GS Yuasa International Ltd., Kyoto (JP)

(72) Inventor: Akifumi Kikuchi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 105 days.

(21) Appl. No.: 16/060,690

(22) PCT Filed: Dec. 8, 2016

(86) PCT No.: PCT/JP2016/086648
§ 371 (c)(1),
(2) Date: Jun. 8, 2018

(87) PCT Pub. No.: WO2017/099201
PCT Pub. Date: Jun. 15, 2017

(65) Prior Publication Data
US 2018/0358614 A1     Dec. 13, 2018

(30) Foreign Application Priority Data

Dec. 11, 2015   (JP) ............... JP2015-242331
Dec. 8, 2016    (JP) ............... JP2016-238488

(51) Int. Cl.
*H01M 4/485*   (2010.01)
*H01M 4/131*   (2010.01)
(Continued)

(52) U.S. Cl.
CPC ........ *H01M 4/485* (2013.01); *H01M 4/131* (2013.01); *H01M 4/1391* (2013.01);
(Continued)

(58) Field of Classification Search
CPC ........ H01M 4/485; H01M 4/525; H01M 4/62; H01M 4/505; H01M 4/131; H01M 4/1391;
(Continued)

(56) References Cited

U.S. PATENT DOCUMENTS 7,727,670 B2    6/2010   Ahn
8,318,343 B2    11/2012  Nakai
(Continued)

FOREIGN PATENT DOCUMENTS

JP    H09199112 A     7/1997
JP    2007335331 A    12/2007
(Continued)

OTHER PUBLICATIONS

International Search Report dated Jan. 17, 2017 filed in PCT/JP2016/086648.
(Continued)

*Primary Examiner* — Eugenia Wang
(74) *Attorney, Agent, or Firm* — Rankin, Hill & Clark LLP

(57) ABSTRACT

One aspect of the present invention is a nonaqueous electrolyte energy storage device including a positive electrode containing a positive composite, the positive composite containing a positive active material, a phosphorus atom and an aluminum atom, in which in a spectrum of the positive composite as measured by X-ray photoelectron spectroscopy, a peak position of P2p is at 134.7 eV or less, and a peak height ratio of Al2p to P2p (Al2p/P2p) is 0.1 or more.

16 Claims, 1 Drawing Sheet

(51) Int. Cl.
  *H01M 4/1391* (2010.01)
  *H01M 10/0525* (2010.01)
  *H01M 4/02* (2006.01)
  *H01M 4/62* (2006.01)
  *H01M 4/505* (2010.01)
  *H01M 4/525* (2010.01)

(52) U.S. Cl.
  CPC ........... *H01M 4/505* (2013.01); *H01M 4/525* (2013.01); *H01M 4/62* (2013.01); *H01M 4/623* (2013.01); *H01M 10/0525* (2013.01); *H01M 2004/028* (2013.01); *H01M 2220/20* (2013.01)

(58) Field of Classification Search
  CPC ............ H01M 4/623; H01M 10/0525; H01M 2004/028; H01M 2220/20
  See application file for complete search history.

(56) References Cited

U.S. PATENT DOCUMENTS

| | | | |
|---|---|---|---|
| 8,486,566 | B2 | 7/2013 | Soma |
| 9,048,508 | B2 | 6/2015 | Kato |
| 9,231,277 | B2 | 1/2016 | Kato |
| 9,653,754 | B2 | 5/2017 | Kato |
| 2007/0059619 | A1* | 3/2007 | Shimoyama ........... G03G 5/144 430/58.7 |
| 2007/0292764 | A1 | 12/2007 | Soma |
| 2008/0254368 | A1 | 10/2008 | Ooyama |
| 2011/0165453 | A1 | 7/2011 | Ogasawara |
| 2012/0164536 | A1 | 6/2012 | Huang et al. |
| 2012/0225350 | A1 | 9/2012 | Soma |
| 2014/0113193 | A1 | 4/2014 | Tsunozaki |
| 2014/0212758 | A1 | 7/2014 | Kawasato |
| 2014/0349166 | A1 | 11/2014 | Chiga |
| 2015/0333321 | A1 | 11/2015 | Naito |
| 2015/0333322 | A1 | 11/2015 | Naito |

FOREIGN PATENT DOCUMENTS

| | | | |
|---|---|---|---|
| JP | 2008027778 | A | 2/2008 |
| JP | 2008506244 | A | 2/2008 |
| JP | 2008270199 | A | 11/2008 |
| JP | 2008277003 | A | 11/2008 |
| JP | 2009087885 | A | 4/2009 |
| JP | 2009123463 | A | 6/2009 |
| JP | 2011141989 | A | 7/2011 |
| JP | 2012079448 | A | 4/2012 |
| JP | 2012160463 | A | 8/2012 |
| JP | 2013152825 | A | 8/2013 |
| JP | 2014149960 | A | 8/2014 |
| JP | 2015118762 | A | 6/2015 |
| JP | 2015122264 | A | 7/2015 |
| JP | 2015219943 | A | 12/2015 |
| WO | 2012176904 | A1 | 12/2012 |
| WO | 2013047877 | A1 | 4/2013 |
| WO | 2013080722 | A1 | 6/2013 |
| WO | 2014155989 | A1 | 10/2014 |
| WO | 2014203621 | A1 | 12/2014 |

OTHER PUBLICATIONS

Extended European Search Report dated Jul. 4, 2019 issued in the corresponding European Patent Application No. 16873094.3.
K.S. Tan et al., "Effect of AlPO4-coating on cathodic behaviour of Li(Ni0.8Co0.2)O2", Journal of Power Sources 141, 2005, pp. 129-142.; Cited in Extended European Search Report.
Baggetto et al., "Surface chemistry of metal oxide coated lithium manganese nickel oxide thin film cathodes studied by XPS", Elsevier, 2013, Electrochimica Acta 90, pp. 135-147; Cited in Chinese Office Action dated Jul. 20, 2020.

* cited by examiner

NONAQUEOUS ELECTROLYTE ENERGY STORAGE DEVICE AND METHOD FOR PRODUCING THE SAME

TECHNICAL FIELD

The present invention relates to a nonaqueous electrolyte energy storage device and a method for producing the nonaqueous electrolyte energy storage device.

BACKGROUND ART

Nonaqueous electrolyte secondary batteries typified by lithium ion secondary batteries are widely used for electronic devices such as personal computers and communication terminals, automobiles and the like because these nonaqueous electrolyte secondary batteries have a high energy density. The nonaqueous electrolyte secondary battery generally includes a pair of electrodes electrically isolated from each other by a separator and a nonaqueous electrolyte interposed between the electrodes, and is configured to be charged and discharged by delivering ions between both the electrodes. Incidentally, as nonaqueous electrolyte energy storage devices other than nonaqueous electrolyte secondary batteries, capacitors such as lithium ion capacitors and electric double layer capacitors have come into wide use.

As techniques related to positive electrodes of nonaqueous electrolyte energy storage devices, the following techniques are known: (1) a technique in which the surface of a positive electrode is covered with an aluminum compound or the like using a coupling agent (see Patent Document 1); (2) a technique in which lithium difluorophosphate is added in a positive electrode (see Patent Document 2); and (3) a technique in which phosphonic acid ($H_3PO_3$) is added to a positive composite paste containing a solvent-based binder (see Patent Documents 3 and 4).

PRIOR ART DOCUMENTS

Patent Documents

Patent Document 1: JP-A-9-199112
Patent Document 2: JP-A-2008-270199
Patent Document 3: JP-A-2013-152825
Patent Document 4: JP-A-2007-335331

SUMMARY OF THE INVENTION

Problems to Be Solved By the Invention

However, as a result of examination by the present inventors, it has been found that the techniques in (1) and (2) do not have a sufficient effect of improving the capacity retention ratio after a charge-discharge cycle. In addition, the present inventors have found that when only phosphonic acid is added to a positive composite paste containing a solvent-based binder as in the technique in (3), the initial discharge capacity of the resulting energy storage device is reduced.

The present invention has been made in view of the above-described situations, and an object of the present invention is to provide a nonaqueous electrolyte energy storage device having a large initial discharge capacity and a high capacity retention ratio after a charge-discharge cycle, and a method for producing such a nonaqueous electrolyte energy storage device.

Means for Solving the Problems

One aspect of the present invention made for solving the above-mentioned problems is a nonaqueous electrolyte energy storage device (A) including a positive electrode containing a positive composite. The positive composite contains a positive active material, a phosphorus atom and an aluminum atom. In a spectrum of the positive composite as measured by X-ray photoelectron spectroscopy, a peak position of P2p is at 134.7 eV or less, and a peak height ratio of Al2p to P2p (Al2p/P2p) is 0.1 or more.

Another aspect of the present invention is a nonaqueous electrolyte energy storage device (B) including a positive electrode containing a positive composite. The positive composite contains a positive active material, a phosphorus atom and an aluminum atom. In a spectrum of the positive composite as measured by X-ray photoelectron spectroscopy, a peak position of P2p is at 134.3 eV or more and 134.7 eV or less.

Another aspect of the present invention is a method (α) for producing the nonaqueous electrolyte energy storage device (A) or the nonaqueous electrolyte energy storage device (B), the method including mixing a positive active material, an oxo acid of phosphorus or an oxo acid salt of fluorinated phosphorus, and an aluminum coupling agent.

Another aspect of the present invention is a method (β) for producing a nonaqueous electrolyte energy storage device, the method including preparing a positive electrode paste by mixing a positive active material, lithium difluorophosphate and a compound represented by general formula (1) below:

[Chemical Formula 1]

(1)

wherein $R^1$ to $R^3$ are each independently a hydrocarbon group having 1 to 9 carbon atoms, or a group represented by general formula (2) below:

[Chemical Formula 2]

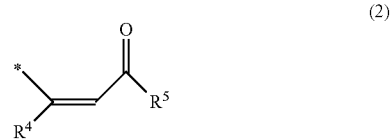
(2)

wherein $R^4$ and $R^5$ are each independently an alkyl group having 1 to 18 carbon atoms or an alkoxy group having 1 to 18 carbon atoms.

Advantages of the Invention

According to the present invention, there can be provided a nonaqueous electrolyte energy storage device having a large initial discharge capacity and a high capacity retention ratio after a charge-discharge cycle, and a method for producing such a nonaqueous electrolyte energy storage device.

MODE FOR CARRYING OUT THE INVENTION

Figure 1:
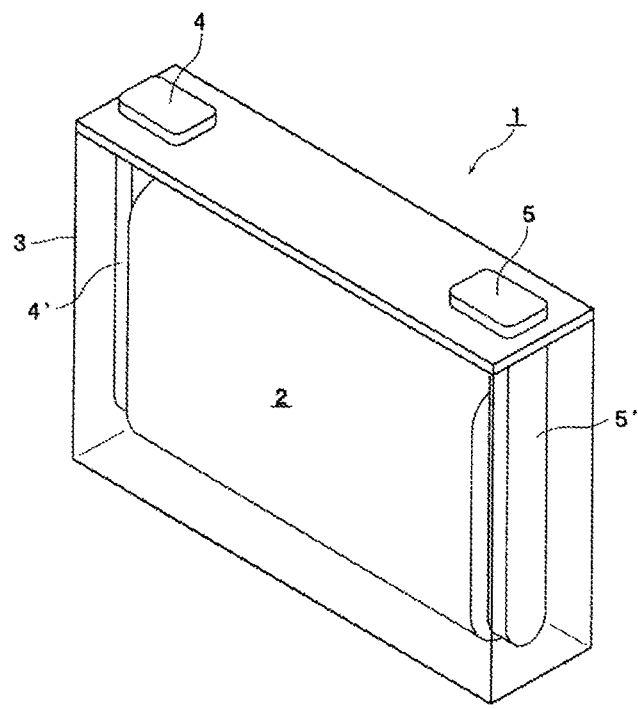
FIG. 1 is an outline perspective view showing a nonaqueous electrolyte energy storage device according to one embodiment of the present invention.

A nonaqueous electrolyte energy storage device according to one embodiment of the present invention is a nonaqueous electrolyte energy storage device (A) (hereinafter, also referred to simply as an "energy storage device (A)") including a positive electrode containing a positive composite. The positive composite contains a positive active material, a phosphorus atom and an aluminum atom. In a spectrum of the positive composite as measured by X-ray photoelectron spectroscopy, a peak position of P2p is at 134.7 eV or less, and a peak height ratio of Al2p to P2p (Al2p/P2p) is 0.1 or more.

The energy storage device (A) has a large initial discharge capacity and a high capacity retention ratio after a charge-discharge cycle. Although the reason for this is not clearly known, the following reason is presumed. One of causes of reducing the discharge capacity in a conventional nonaqueous electrolyte energy storage device is elution of a positive active material component such as a nickel-containing compound or a manganese-containing compound from the positive electrode by a very small amount of hydrogen fluoride (HF) present in a nonaqueous electrolyte. This elution easily occurs particularly during high voltage operation. The eluted positive active material component is deposited on a negative electrode surface, leading to an increase in side reaction amount of a negative electrode. It is presumed that as a result thereof, resistance is increased, and the discharge capacity is reduced due to loss of a capacity balance. Incidentally, it is presumed that a very small amount of HF in the nonaqueous electrolyte is generated by decomposition of a fluorine atom-containing electrolyte salt in the vicinity of the positive electrode. Meanwhile, for the energy storage device (A) according to one embodiment of the present invention, the peak of P2p, which appears at 134.7 eV or less, is a peak of a phosphorus atom derived from an oxo acid of phosphorus such as phosphonic acid or an oxo acid salt of fluorinated phosphorus. That is, the above-mentioned peak indicates that phosphorus atoms derived from an oxo acid of phosphorus or an oxo acid salt of fluorinated phosphorus are present on the surface of the positive composite, and the phosphorus atoms are presumed to form a protective film (hereinafter, also referred to as a "film") on the surface of the positive composite. In the energy storage device (A), such a film can suppress a decomposition reaction of a fluorine atom-containing electrolyte salt on the surface of a positive composite, and inhibit elution of a positive active material component, resulting in an increase in a capacity retention ratio. Further, in the energy storage device (A), the peak height ratio of Al2p to P2p (Al2p/P2p) in the spectrum is 0.1 or more, which indicates that a sufficient amount of aluminum atoms are present on the surface of the positive composite. The aluminum atoms on the surface of the positive composite are presumed to form an acid-resistant film, and consequently, the initial discharge capacity can be increased, and the capacity retention ratio can be further increased. The phosphorus atoms and the aluminum atoms on the surface of the positive composite may be present in a single-layer film, or form a multilayer structure of a phosphorus atom-containing layer and an aluminum atom-containing layer.

A nonaqueous electrolyte energy storage device according to another aspect of the present invention is a nonaqueous electrolyte energy storage device (B) (hereinafter, also referred to simply as an "energy storage device (B)") including a positive electrode containing a positive composite. The positive composite contains a positive active material, a phosphorus atom and an aluminum atom. In a spectrum of the positive composite as measured by X-ray photoelectron spectroscopy, a peak position of P2p is at 134.3 eV or more and 134.7 eV or less.

The energy storage device (B) has a large initial discharge capacity, a high capacity retention ratio after a charge-discharge cycle, and high positive composite adhesion. Although the reason for this is not clear, the following reason is presumed. For the energy storage device (B), the peak of P2p, which appears at 134.3 eV or more and 134.7 eV or less, emerges when a positive composite is prepared using a positive composite paste containing a specific oxo acid salt of fluorinated phosphorus and a specific aluminum coupling agent. It is presumed that on the surface of the positive composite prepared using such a component, a film is formed which sufficiently suppresses elution of a positive active material component regardless of the abundance of aluminum atoms and which has acid resistance. Therefore, according to the energy storage device (B), the initial discharge capacity can be increased to increase the capacity retention ratio owing to the film. In addition, the present inventors have found that when merely lithium difluorophosphate is included in a positive electrode as in Patent Document 2, there is a disadvantage that the adhesion of the positive composite is reduced. However, according to the energy storage device (B), the adhesion of the positive composite can be enhanced when the positive composite is formed using a specific oxo acid salt of fluorinated phosphorus and a specific aluminum coupling agent as described above.

Incidentally, according to the energy storage device (B), it is possible to achieve the purpose of providing a nonaqueous electrolyte energy storage device which includes a positive electrode having favorable adhesion, and has excellent cycle performance (energy density retention ratio).

In the spectrum of the positive composite of the energy storage device (B), the peak height ratio of Al2p to P2p (Al2p/P2p) is preferably 0.1 or more. Here, a sufficient amount of aluminum atoms is present on the surface of the positive composite, so that the initial discharge capacity etc. can be further increased.

In the energy storage device (A) and the energy storage device (B), it is preferable that the positive active material contains a metal oxide, and in the spectrum of the positive composite, the peak height ratio of Al2p to O1s (Al2p/O1s) is 0.1 or less. When the peak height ratio (Al2p/O1s) is 0.1 or less, a film containing an appropriate amount of aluminum is formed on the surface of the positive active material. Thus, a reaction of the nonaqueous electrolyte with the positive active material is suppressed, and an increase in internal resistance of the energy storage device is suppressed. Therefore, the initial discharge capacity and the capacity retention ratio can be accordingly further increased. Here, the peak of O1s refers to a peak having the highest peak intensity among peaks present in the vicinity of 529.6 eV, more specifically in a range of 530.5 to 529.0 eV. Such a peak is a peak derived from oxygen bonded to a metal, the peak being derived from oxygen contained in the positive active material and aluminum oxide present in the film on the surface of the positive active material.

In the energy storage device (A) and the energy storage device (B), it is preferable that the positive active material contains a metal oxide, and in the spectrum of the positive composite, the peak height ratio of Al2p to O1s (Al2p/O1s) is 0.01 or more. The peak height ratio (Al2p/O1s) being 0.01 or more means that aluminum atoms in an amount sufficient to some extent are present in the vicinity of the surface of the positive active material containing a metal oxide. Therefore, the initial discharge capacity can be accordingly further increased.

In the spectrum of the positive composite of each of the energy storage device (A) and the energy storage device (B), the peak height ratio of Al2p to P2p (Al2p/P2p) is preferably 1.0 or less. Accordingly, a sufficient amount of phosphorus atoms can be made to exist relatively to aluminum on the surface of the positive composite (positive active material), so that the capacity retention ratio can be further increased.

A sample to be used for measurement of the spectrum of the positive composite by X-ray photoelectron spectroscopy (XPS) is prepared by the following method. The nonaqueous electrolyte energy storage device is discharged at a current of 0.1 C to an end-of-discharge voltage under normal usage to bring the nonaqueous electrolyte energy storage device into an end-of-discharge state. Here, the term "under normal usage" means use of the energy storage device while employing discharge conditions recommended or specified in the energy storage device. The energy storage device in an end-of-discharge state is disassembled, the positive electrode is taken out, and the electrode is sufficiently cleaned with use of dimethyl carbonate, and then dried under vacuum at room temperature. The dried positive electrode is cut into a predetermined size (e.g., 2×2 cm) to obtain a sample in XPS spectrum measurement. Operations from disassembly of the battery to XPS measurement are carried out in an argon atmosphere with a dew point of −60° C. or lower. The apparatus to be used in the XPS spectrum of the positive composite and measurement conditions are as follows.

Apparatus: "AXIS NOVA" from KRATOS ANALYTICAL Ltd.
X-ray source: Monochromatic AlKα
Acceleration voltage: 15 kV
Analysis area: 700 μm×300 μm
Measurement range: O1s=543 to 522 eV, P2p=142 to 125 eV, Al2p=86 to 63 eV and C1s=300 to 272 eV
Measurement interval: 0.1 eV
Measurement time: O1s=52.5 seconds per time, P2p=72.3 seconds per time, Al2p=68.7 seconds per time and C1s=70.0 seconds per time
Cumulative number: O1s=8 times, P2p=15 times, Al2p=15 times and C1s=8 times
Relative sensitivity factor: C1s=1 P2p=1.19 O1s=2.93 Al2p=0.537

Incidentally, the peak position and the peak height in the spectrum are values determined in the following manner using CasaXPS (manufactured by Casa Software). First, the peak of sp 2 carbon in C1s is set to 284.8 eV, and all of the resulting spectra are corrected. Next, for each spectrum, leveling processing is performed by removing the background using a straight-line method. In the spectrum after leveling processing, the spectrum of each element is corrected using the relative sensitivity factor, and a value with the highest peak intensity is defined as a peak height. Also, bonding energy indicating this peak height is defined as a peak position.

A method for producing the nonaqueous electrolyte energy storage device according to one embodiment of the present invention is a method (α) for producing the energy storage device (A) or energy storage device (B), the method including mixing a positive active material, an oxo acid of phosphorus or an oxo acid salt of fluorinated phosphorus, and an aluminum coupling agent.

According to the production method (α), it is possible to produce a nonaqueous electrolyte energy storage device having a large initial discharge capacity and a high capacity retention ratio after a charge-discharge cycle. This effect is presumed to be ascribable to a film formed on the surface of the positive composite by an oxo acid of phosphorus or an oxo acid salt of fluorinated phosphorus and an aluminum coupling agent. That is, it is presumed that as described above, the film to be formed contains aluminum atoms, and thus serves as a favorable protective layer, and the oxo acid of phosphorus, etc. suppresses a decomposition reaction of a fluorine atom-containing electrolyte salt on the surface of the positive composite.

In the production method (α), it is preferable that the mixing amount of the aluminum coupling agent based on 100 parts by mass of the positive active material is preferably 0.4 parts by mass or more. Accordingly, the amount of aluminum atoms in the film to be formed is particularly sufficient, so that the initial discharge capacity and capacity retention ratio of the resulting energy storage device can be further increased.

A method for producing a nonaqueous electrolyte energy storage device according to another embodiment of the present invention is a method (β) for producing a nonaqueous electrolyte energy storage device, the method including preparing a positive electrode paste by mixing a positive active material, lithium difluorophosphate and a compound represented by the following general formula (1):

[Chemical Formula 3]

(1)

wherein $R^1$ to $R^3$ are each independently a hydrocarbon group having 1 to 9 carbon atoms, or a group represented by general formula (2) below:

[Chemical Formula 4]

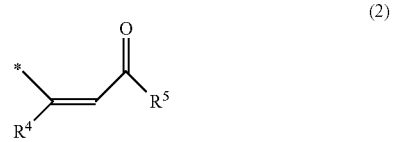

(2)

wherein $R^4$ and $R^5$ are each independently an alkyl group having 1 to 18 carbon atoms or an alkoxy group having 1 to 18 carbon atoms.

When coming into contact with the positive active material, the compound represented by the general formula (1) is hydrolyzed by a catalytic action to cover the surface of the positive active material. Lithium difluorophosphate reacts with an acid such as hydrofluoric acid (HF), which is present in a very small amount in the nonaqueous electrolyte, adsorbed moisture or a surface functional group on the surface of the active material to form a film of phosphorus oxide on the surface of the positive active material. Thus, when the compound represented by the general formula (1) as an aluminum source and lithium difluorophosphate as a phosphorus source coexist in the positive composite paste, a film containing aluminum and phosphorus oxide is suitably formed on the surface of the positive active material. According to the production method (β), it is possible to effectively obtain the nonaqueous electrolyte energy storage device (B) including a positive electrode containing a positive composite, the positive composite containing a positive active material, a phosphorus atom and an aluminum atom, in which in a spectrum of the positive composite as measured by X-ray photoelectron spectroscopy, a peak position of P2p is at 134.3 eV or more and 134.7 eV or less. That is, according to the production method (β), it is possible to obtain an energy storage device having a large initial discharge capacity, a high capacity retention ratio after a charge-discharge cycle, and high positive composite adhesion.

In the production method (β), it is preferable that the mixing amount of the lithium difluorophosphate is 0.3 parts by mass or more and 1 part by mass or less based on 100 parts by mass of the positive active material, and the mixing amount of the compound represented by the general formula (1) is preferably 0.3 parts by mass or more and 1 part by mass or less based on 100 parts by mass of the positive active material. When the mixing amount of each of these components is within the above-mentioned range, the content of phosphorus atoms and the content of aluminum atoms in the film to be formed can be made more suitable to further improve the initial discharge capacity, capacity retention ratio and positive composite adhesion of the resulting energy storage device.

Hereinafter, a nonaqueous electrolyte energy storage device according to one embodiment of the present invention, and a method for producing the nonaqueous electrolyte energy storage device will be described in detail.

<Nonaqueous Electrolyte Energy Storage Device (A)>

The energy storage device (A) according to one embodiment of the present invention includes a positive electrode, a negative electrode and a nonaqueous electrolyte. Hereinafter, a nonaqueous electrolyte secondary battery will be described as one example of the nonaqueous electrolyte energy storage device (A). The positive electrode and the negative electrode normally form an electrode assembly in which the positive electrode and the negative electrode are alternately superposed by lamination or winding with a separator interposed between the electrodes. The electrode assembly is housed in a case, and the case is filled with the nonaqueous electrolyte. The nonaqueous electrolyte exists between the positive electrode and the negative electrode. Incidentally, as the case, a known aluminum case, a resin case or the like, which is usually used as a case of a nonaqueous electrolyte secondary battery, can be used.

(Positive Electrode)

The positive electrode includes a positive electrode substrate, and a positive composite layer disposed on the positive electrode substrate directly or with an intermediate layer interposed between the positive electrode substrate and the positive composite layer.

The positive electrode substrate has conductivity. As a material of the substrate, a metal such as aluminum, titanium, tantalum, stainless steel or nickel, or an alloy thereof is used. Incidentally, the material of the substrate may be fired carbon, a conductive polymer, conductive glass or the like. For the purpose of improving bondability, conductivity and oxidation resistance, it is also possible to use aluminum, copper or the like, the surface of which is treated with carbon, nickel, titanium, silver or the like. Of these, aluminum and aluminum alloys are preferable from the viewpoint of balance of high electric potential resistance, high conductivity and cost. Incidentally, examples of the form of the positive electrode substrate include foils and vapor deposition films, with foils being preferable from the viewpoint of cost. That is, an aluminum foil is preferable as the positive electrode substrate. Examples of the aluminum and the aluminum alloy may include A1085P and A3003P specified in JIS-H-4000 (2014).

The intermediate layer is a layer covering the surface of the positive electrode substrate, and contains conductive particles such as carbon particles, so that contact resistance between the positive electrode substrate and the positive composite layer is reduced. The configuration of the intermediate layer is not particularly limited, and can be formed from, for example, a composition containing a resin binder and conductive particles. The term "conductive" means that the volume resistivity measured in accordance with JIS-H-0505 (1975) is $10^7$ Ω·cm or less, and the term "nonconductive" means that the volume resistivity is more than $10^7$ Ω·cm.

The positive composite layer is a layer formed from a so-called positive composite containing a positive active material. The positive composite contains phosphorus atoms and aluminum atoms, and contains optional components such as a conductive agent, a binder (binding agent), a thickener and a filler as necessary. It is presumed that the phosphorus atom and the aluminum atom are present in the film covering the positive active material. Incidentally, the phosphorus atom and aluminum atom are preferably present on the surfaces of particles or between particles of the positive active material, more preferably present on the surfaces of particles.

As the positive active material, a metal oxide is normally used. Specific examples of the positive active material include composite oxides represented by $Li_xMO_y$ (M represents at least one transition metal) ($Li_xCoO_2$, $Li_xNiO_2$, $Li_xMnO_3$, $Li_xNi_\alpha Co_{(1-\alpha)}O_2$, $Li_xNi_\alpha Mn_\beta Co_{(1-\alpha-\beta)}O_2$ and the like each having a layered α-NaFeO$_2$-type crystal structure, and $Li_xMnO_4$, $Li_xNi_\alpha Mn_{(2-\alpha)}O_4$ and the like each having a spinel-type crystal structure), and polyanion compounds represented by $Li_wMe_x(XO_y)_z$ (Me represents at least one transition metal, and X represents, for example, P, Si, B, V or the like) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$ and the like). Elements or polyanions in these compounds may be partially substituted with other elements or anionic species. In the positive composite layer, one of these compounds may be used singly, or two or more of these compounds may be mixed and used.

Among the above-mentioned positive active materials, when a positive active material containing nickel atoms and/or manganese atoms is used, the effect of the present invention can be more effectively exhibited. As described above, a very small amount of HF present in the nonaqueous electrolyte causes components of the positive active material to be eluted from the positive composite layer, which affects the discharge capacity and the like. When the positive active material is a nickel-containing compound or manganese-containing compound, the above-mentioned elution easily occurs, so that the discharge capacity and the like are easily affected. Thus, by covering the positive active material with the specific film containing phosphorus atoms and aluminum atoms, elution of a nickel-containing compound or manganese-containing compound can be effectively inhibited. Incidentally, for example, the substantial discharge capacity of the positive electrode in this embodiment can be increased when a high-capacity positive active material including lithium nickel oxide or a lithium-transition metal composite oxide of lithium-excess-type is used.

In the spectrum of the positive composite layer (positive composite) as measured by X-ray photoelectron spectroscopy, the peak position of P2p may be at 134.7 eV or less, preferably at 134 eV or less, more preferably at 133.7 eV or less. Incidentally, this peak position is preferably at 130 eV or more, more preferably at 132 eV or more, still more preferably at 133 eV or more, still more preferably at 133.4 eV or more. This peak position may be at 134 eV or more, or at 134.3 eV or more.

The peak of P2p, which appears in the above-mentioned range, is a peak of a phosphorus atom derived from an oxo acid of phosphorus or an oxo acid salt of fluorinated phosphorus. This phosphorus atom is normally present on the surface of a particulate positive active material. By this phosphorus atom, a decomposition reaction of a fluorine atom-containing electrolyte salt in the vicinity of the positive electrode can be suppressed to inhibit elution of a positive active material component. Preferably, this phosphorus atom is present on the surface of the positive active material as a compound containing a $PO_3$ anion, a $PO_4$ anion or a $PO_xF_y$ anion in which some of oxygen atoms of a $PO_3$ anion or $PO_4$ anion are substituted with a fluorine atom. In the spectrum measured by X-ray photoelectron spectroscopy, the peak of a phosphorus atom (P2p) in the compound appears at 133 eV or more and 134.7 eV or less. Incidentally, in the above-mentioned spectrum, peaks may be present outside the above-mentioned range. The peak of P2p, which appears at bonding energy higher than 134.7 eV, is a peak of a phosphorus atom derived from a fluoride of phosphorus, for example.

In the above-mentioned spectrum, the lower limit of the peak height ratio of P2p to O1S (P2p/O1s) is, for example, preferably 0.05, more preferably 0.08. Meanwhile, the upper limit of the peak height ratio (P2p/O1s) is, for example, preferably 1, more preferably 0.7, still more preferably 0.5. Further, the upper limit of the peak height ratio (P2p/O1s) is preferably 0.2, more preferably 0.15, still more preferably 0.1. When the peak height ratio (P2p/O1s) is within the above-mentioned range, a more suitable amount of phosphorus atoms can be made to exist on the surface of the positive active material, so that the capacity retention ratio can be further increased.

In the above-mentioned spectrum, the lower limit of the peak height ratio of Al2p to P2p (Al2p/P2p) is 0.1, preferably 0.15. When the peak height ratio (Al2p/P2p) is not less than the above-mentioned lower limit, a sufficient amount of aluminum atoms can be made to exist on the surface of the positive composite layer (positive active material), so that the initial discharge capacity can be increased. The upper limit of the peak height ratio (Al2p/P2p) is, for example, 1.0, preferably 0.5, more preferably 0.3.

In the above-mentioned spectrum, the lower limit of the peak height ratio of Al2p to O1s (Al2p/O1s) is preferably 0.01, more preferably 0.02. When the peak height ratio (Al2p/O1s) is not less than the above-mentioned lower limit, for example, the initial discharge capacity can be further increased. Meanwhile, the upper limit of the peak height ratio (Al2p/O1s) is preferably 0.5, more preferably 0.2, still more preferably 0.1.

The conductive agent is not particularly limited as long as it is a conductive material which does not adversely affect the performance of the energy storage device. Examples of the conductive agent include carbon black such as natural or artificial graphite, furnace black, acetylene black and ketjen black, metals and conductive ceramics, with acetylene black being preferable. Examples of the shape of the conductive agent include a powdery shape and a fibrous shape. Among the conductive agents, artificial graphite, acetylene black and carbon fibers are preferable, with acetylene black being more preferable. The lower limit of the content of the conductive agent is preferably 0.1% by mass, more preferably 0.5% by mass based on the total mass of the positive composite layer. Meanwhile, the upper limit of the content of the conductive agent is preferably 50% by mass, more preferably 30% by mass.

Examples of the binder (binding agent) include thermoplastic resins such as fluororesins (polytetrafluoroethylene (PTFE), polyvinylidene fluoride (PVDF) and the like), polyethylene, polypropylene and polyimide; elastomers such as ethylene-propylene-diene rubber (EPDM), sulfonated EPDM, styrene butadiene rubber (SBR) and fluorine rubber; and polysaccharide polymers.

Examples of the thickener include polysaccharide polymers such as carboxymethylcellulose (CMC) and methylcellulose. When the thickener has a functional group reactive with lithium, it is preferable to deactivate the functional group by methylation or the like in advance.

The filler is not particularly limited as long as it does not adversely affect battery performance. Examples of the main component of the filler include polyolefins such as polypropylene and polyethylene, silica, alumina, zeolite and glass.

(Negative Electrode)

The negative electrode includes a negative electrode substrate, and a negative composite layer disposed on the negative electrode substrate directly or with an intermediate layer interposed between the negative electrode substrate and the negative composite layer. The intermediate layer may have the same configuration as that of the intermediate layer of the positive electrode.

The negative electrode substrate may have the same configuration as that of the positive electrode substrate, and as a material thereof, a metal such as copper, nickel, iron, titanium, aluminum, stainless steel or nickel-plated steel, or an alloy thereof (e.g., Al—Cd alloy) is used. Incidentally, for the purpose of bondability, conductivity and reduction resistance, it is also possible to use copper or the like, the surface of which is treated with carbon, nickel, titanium, silver or the like. Among the above-mentioned materials, copper or a copper alloy is preferable. That is, copper foil is preferable as the negative electrode substrate. Examples of the copper foil include rolled copper foils and electrolytic copper foils.

The negative composite layer is formed from a so-called negative composite containing a negative active material. Incidentally, the negative composite that forms the negative composite layer contains optional components such as a conductive agent, a binder (binding agent), a thickener and a filler as necessary. As the optional components such as a conductive agent, a binding agent, a thickener and a filler, the same components as in the positive composite layer can be used.

As the negative active material, a material capable of absorbing and releasing lithium ions is normally used. Specific examples of the negative active material include metals or semi-metals such as Si and Sn; metal oxides or semi-metal oxides such as Si oxide and Sn oxide; polyphosphoric acid compounds; and carbon materials such as graphite, amorphous carbon (graphitizable carbon or non-graphitizable carbon). Among them, graphite is preferable as a negative active material because it has an operating potential extremely close to that of metallic lithium, so that charge-discharge can be performed at a high operating voltage. For example, artificial graphite and natural graphite are preferable. In particular, graphite in which the surfaces of negative active material particles are modified with amorphous carbon or the like is preferable because gas generation during charge is small. These negative active materials may be used singly, or used in any combination and ratio of two or more thereof. As the negative active material, a carbonaceous material or a lithium composite oxide is preferably used from the viewpoint of safety.

Further, the negative composite (negative composite layer) may contain a typical nonmetallic element such as B, N, P, F, Cl, Br or I; a typical metallic element such as Li, Na, Mg, Al, K, Ca, Zn, Ga or Ge; or a transition metal element such as Sc, Ti, V, Cr, Mn, Fe, Co, Ni, Cu, Mo, Zr, Ta, Hf, Nb or W.

(Separator)

As a material of the separator, for example, a woven fabric, a nonwoven fabric, a porous resin film or the like is used. Among them, a porous resin film is preferable from the viewpoint of strength, and a nonwoven fabric is preferable from the viewpoint of liquid retainability of the nonaqueous electrolyte. Examples of the material that forms the separator may include polyolefins, typically polyethylene, polypropylene and the like; polyesters, typically polyethylene terephthalate, polybutylene terephthalate and the like; polyvinylidene fluoride; vinylidene fluoride-hexa fluoropropylene copolymers; vinylidene fluoride-perfluorovinyl ether copolymers; vinylidene fluoride-tetrafluoroethylene copolymers; vinylidene fluoride-trifluoroethylene copolymers; vinylidene fluoride-fluoroethylene copolymers; vinylidene fluoride-hexafluoroacetone copolymers; vinylidene fluoride-ethylene copolymers; vinylidene fluoride-propylene copolymers; vinylidene fluoride-trifluoropropylene copolymers; vinylidene fluoride-tetrafluoroethylene-hexafluoropropylene copolymers; and vinylidene fluoride-ethylene-tetrafluoroethylene copolymer. As a main component of the separator, a polyolefin such as polyethylene or polypropylene is preferable from the viewpoint of strength, and polyimide, aramid or the like is preferable from the viewpoint of resistance to oxidation and decomposition. Incidentally, these resins may be combined.

The porosity of the separator is preferably 98% by volume or less from the viewpoint of strength. From the viewpoint of charge-discharge performance, the porosity is preferably 20% by volume or more.

For the separator, a polymer gel including a polymer such as acrylonitrile, ethylene oxide, propylene oxide, methyl methacrylate, vinyl acetate, vinyl pyrrolidone, polyvinylidene fluoride or the like and an electrolyte may be used. Use of the nonaqueous electrolyte in a gel state is preferable because an effect of preventing liquid leakage is exhibited.

Further, use of the above-mentioned porous film or nonwoven fabric and polymer gel in combination as the separator is preferable because the liquid retainability of the electrolyte is improved. For example, a film in which a surface of a polyethylene microporous film and microporous wall surfaces are covered with a solvent-philic polymer having a thickness of several μm or less is formed, and an electrolyte is held in the micropores of the film, so that the solvent-philic polymer is gelled.

Examples of the solvent-philic polymer include polyvinylidene fluoride, and polymers an acrylate monomer having an ethylene oxide group, an ester group or the like, an epoxy monomer, a monomer having an isocyanate group, or the like is crosslinked. Such a monomer can be subjected to a crosslinking reaction by irradiation of an electron beam (EB) or by adding a radical initiator and heating the monomer or irradiating the monomer with an ultraviolet ray (UV).

An inorganic layer may be disposed between the separator and the electrode (normally the positive electrode). The inorganic layer is a porous layer that is also called a heat-resistant layer or the like. Incidentally, it is also possible to use a separator with an inorganic layer formed on one surface of a porous resin film. The inorganic layer normally includes inorganic particles and a binder, and may contain other components.

(Nonaqueous Electrolyte)

As the nonaqueous electrolyte, a known nonaqueous electrolyte that is normally used in a common nonaqueous electrolyte secondary battery can be used. The nonaqueous electrolyte contains a nonaqueous solvent, and an electrolyte salt dissolved in the nonaqueous solvent.

As the nonaqueous solvent, a known nonaqueous solvent that is normally used as a nonaqueous solvent of a common nonaqueous electrolyte for a secondary battery can be used. Examples of the nonaqueous solvent may include cyclic carbonate, linear carbonate, esters, ethers, amides, sulfone, lactones and nitriles. Among these nonaqueous solvents, it is preferable to use at least cyclic carbonate or chain carbonate, and it is more preferable to use cyclic carbonate and chain carbonate in combination.

Examples of the cyclic carbonate may include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate and 1,2-diphenylvinylene carbonate, with ethylene carbonate (EC) being preferable.

Examples of the chain carbonate may include diethyl carbonate (DEC), dimethyl carbonate (DMC), ethyl methyl carbonate (EMC) and diphenyl carbonate, with ethyl methyl carbonate (EMC) being preferable.

Examples of the electrolyte salt may include lithium salts, sodium salts, potassium salts, magnesium salts and onium salts, with lithium salts being preferable. Examples of the lithium salt may include inorganic lithium salts such as $LiPF_6$, $LiPO_2F_2$, $LiBF_4$, $LiPF_2(C_2O_4)_2$, $LiClO_4$ and $LiN(SO_2F)_2$, and lithium salts having a fluorinated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$.

Among the above-mentioned electrolyte salts, when a fluorine atom-containing electrolyte salt is used, the effect of the present invention is further exhibited. As described above, HF in the nonaqueous electrolyte, which causes elution of a positive active material component, is generated by, for example, decomposition of a fluorine atom-containing electrolyte salt. Particularly, $LiPF_6$, $LiPO_2F_2$, $LiBF_4$, $LiPF_2(C_2O_4)_2$ and the like are easily decomposed to generate HF. Therefore, normally, use of such an electrolyte salt easily causes a reduction in discharge capacity, etc. due to elution of a positive active material component. However, in the energy storage device, generation of HF by decomposition can be suppressed to inhibit a reduction in discharge capacity even when such a fluorine atom-containing electrolyte salt is used.

The lower limit of the concentration of the electrolyte salt in the nonaqueous electrolyte is preferably 0.1 mol/L, more preferably 0.5 mol/L. Meanwhile, the upper limit of the above-mentioned concentration is preferably 5 mol/L, more preferably 2.5 mol/L.

The nonaqueous electrolyte may contain other additives. As the additive, an electrolyte additive that is generally used in a nonaqueous electrolyte energy storage device can be used. Examples of the electrolyte additive may include aromatic compounds such as biphenyl, alkylbiphenyls, terphenyl, partially hydrogenated products of terphenyl, cyclohexylbenzene, t-butylbenzene, t-amylbenzene, diphenyl ether and dibenzofuran; partially fluorinated products of the aromatic compounds such as 2-fluorobiphenyl, o-cyclohexylfluorobenzene and p-cyclohexyl fluorobenzene; overcharge preventing agents such as fluorine-containing anisole compounds such as 2,4-difluoroanisole, 2,5-difluoroanisole, 2,6-difluoroanisole and 3,5-difluoroanisole; negative electrode film forming agents such as vinylene carbonate, methylvinylene carbonate, ethylvinylene carbonate, fluoroethylene carbonate, difluoroethylene carbonate, trifluoropropylene carbonate, succinic anhydride, glutaric anhydride, maleic anhydride, citraconic anhydride, glutaconic anhydride, itaconic anhydride and cyclohexanedicarboxylic anhydride; and ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethylsulfoxide, diethylsulfoxide, tetramethylene sulfoxide, diphenyl sulfide, thioanisole, diphenyl disulfide and dipyridinium disulfide; perfluorooctane; tristrimethylsilyl borate; tristrimethylsilyl phosphate; and tetrakistrimethylsilyl titanate. These additives can be used singly, or in combination of two or more thereof. By adding these additives, safety can be further improved, and capacity retention performance after storage at a high temperature and cycle performance can be improved.

The content ratio of the additives is not particularly limited, but the lower limit thereof is preferably 0.01% by mass, more preferably 0.1% by mass, still more preferably 0.2% by mass based on the total amount of the nonaqueous electrolyte. Meanwhile, the upper limit of the content ratio of the additives is preferably 5% by mass, more preferably 3% by mass, still more preferably 2% by mass, and may be 1% by mass or 0.1% by mass.

As the nonaqueous electrolyte, a salt that is melted at normal temperature, an ionic liquid, a polymer solid electrolyte, or the like can also be used.

<Nonaqueous Electrolyte Energy Storage Device (B)>

The energy storage device (B) according to another embodiment of the present invention is the same as the energy storage device (A) except that in the spectrum of the positive composite layer (positive composite) measured by X-ray photoelectron spectroscopy, the peak height ratio of Al2p to P2p (Al2p/P2p) is not necessarily required to be 0.1 or more, and on the other hand, the peak position of P2p is at 134.3 eV or more and 134.7 eV or less.

In the energy storage device (B), the upper limit of the peak position of P2p is preferably at 134.6 eV, more preferably at 134.5 eV. Incidentally, the lower limit of the peak height ratio of Al2p to P2p (Al2p/P2p) is preferably 0.1, more preferably 0.15.

Since preferred forms of other peak height ratios, compositions of the positive composite layer (positive composite) and so on, and a structure in the energy storage device (B) are the same as in the energy storage device (A), the description of the energy storage device (A) can be consulted.

Preferably, the positive composite layer (positive composite) of the energy storage device (B) includes a film derived from lithium difluorophosphate (LiPO$_2$F$_2$) and a compound represented by the following general formula (1). When the positive composite layer includes such a film, the initial discharge capacity, the capacity retention ratio, adhesion and the like can be further improved.

[Chemical Formula 5]

(1)

In the general formula (1), R$^1$ to R$^3$ are each independently a hydrocarbon group having 1 to 9 carbon atoms, or a group represented by the following general formula (2).

[Chemical Formula 6]

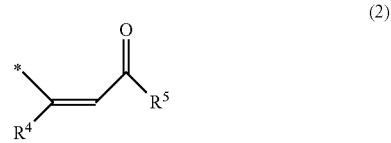

(2)

In the general formula (2), R$^4$ and R$^5$ are each independently an alkyl group having 1 to 18 carbon atoms or an alkoxy group having 1 to 18 carbon atoms. The oxy group (=O) in the general formula (2) may form a coordinate bond with an aluminum atom in the formula (1).

The hydrocarbon group having 1 to 9 carbon atoms may be either an aliphatic hydrocarbon group having 1 to 9 carbon atoms or an aromatic hydrocarbon group having 6 to 9 carbon atoms.

Examples of the aliphatic hydrocarbon group having 1 to 9 carbon atoms may include:

alkyl groups such as a methyl group, an ethyl group, a n-propyl group, an i-propyl group, a n-butyl group, an i-butyl group and a t-butyl group;

alkenyl groups such as an ethenyl group and a propenyl group; and alkynyl groups such as an ethynyl group and a propynyl group.

Examples of the aromatic hydrocarbon group having 6 to 9 carbon atoms may include a phenyl group, a benzyl group and a tolyl group.

Examples of the alkyl group having 1 to 18 carbon atoms may include a decyl group and an octadecyl group in addition to the above-mentioned alkyl groups.

The alkoxy group having 1 to 18 carbon atoms is a group in which an oxygen atom is bonded to the alkyl group having 1 to 18 carbon atoms, and examples thereof may include a methoxy group and an ethoxy group.

As R$^1$ to R$^3$, alkyl groups and groups represented by the general formula (2) are preferable. Among the alkyl groups, an alkyl group having 1 to 5 carbon atoms is preferable, with an i-propyl group being more preferable. R$^4$ is preferably an alkyl group, more preferably an alkyl group having 1 to 5 carbon atoms, still more preferably a methyl group or an ethyl group. R$^5$ is preferably an alkoxy group, more preferably an alkoxy group having 1 to 5 carbon atoms, still more preferably a methoxy group or an ethoxy group. It is more preferable that two of R$^1$ to R$^3$ are alkyl groups and the other is a group represented by the general formula (2).

Examples of the compound represented by the general formula (1) may include aluminum alkoxides and aluminum chelates, and specific examples thereof may include ethylacetoacetate aluminum diethoxide, ethylacetoacetate aluminum diisopropoxide, ethylacetoacetate aluminum di(tert-butoxide), acetylacetonate aluminum diisopropoxide, aluminum trisacetylacetonate, aluminum isopropoxide, aluminum acetylacetonate bis(ethylacetoacetate) and aluminum trisethylacetoacetate. Among these compounds, ethylacetoacetate aluminum diisopropoxide is preferable because a uniform film can be formed.

<Method (α) for Producing Nonaqueous Electrolyte Energy Storage Device>

The energy storage devices (A) and (B) can be produced using known production methods in combination, but it is preferable to produce the energy storage devices by the following method. That is, a method for producing a nonaqueous electrolyte energy storage device according to one embodiment of the present invention is a method (α) for producing the energy storage device (A) or energy storage device (B), the method including mixing a positive active material, an oxo acid of phosphorus or an oxo acid salt of fluorinated phosphorus, and an aluminum coupling agent.

A positive composite paste is obtained by mixing the positive active material, an oxo acid of phosphorus or an oxo acid salt of fluorinated phosphorus and an aluminum coupling agent. The positive composite paste is applied to the surface of the positive electrode substrate, and dried to obtain a positive electrode. The positive active material is as described above. Incidentally, the positive composite paste may contain optional components that may be contained in the positive composite, in addition to the materials described above.

The oxo acid of phosphorus refers to a compound having a structure in which a hydroxyl group (—OH) and an oxy group (=O) are bonded to a phosphorus atom. Examples of the oxo acid of phosphorus include phosphoric acid ($H_3PO_4$), phosphonic acid ($H_3PO_3$), phosphinic acid ($H_3PO_2$), pyrophosphoric acid ($H_4P_2O_7$) and polyphosphoric acid. The oxo acid of phosphorus may be an ester compound in which hydrogen of a hydroxyl group (—OH) bonded to a phosphorus atom is substituted with an organic group. Examples of the organic group include hydrocarbon groups such as a methyl group and an ethyl group. Among these oxo acids, phosphoric acid and phosphonic acid are preferable, with phosphonic acid being more preferable. Examples of the oxo acid salt of fluorinated phosphorus include lithium salts such as lithium monofluorophosphate and lithium difluorophosphate, with lithium difluorophosphate being preferable. By the oxo acid of phosphorus or the oxo acid salt of fluorinated phosphorus, a film containing phosphorus atoms can be formed on the positive composite (positive active material). Incidentally, the peak position of a phosphorus atom (P2p) derived from the oxo acid of phosphorus, etc. in the spectrum appears at 134.7 eV or less.

The lower limit of the mixing amount of the oxo acid of phosphorus or oxo acid salt of fluorinated phosphorus in the positive composite paste is preferably 0.1 parts by mass, more preferably 0.2 parts by mass, still more preferably 0.3 parts by mass based on 100 parts by mass of the positive active material. Meanwhile, the upper limit of the mixing amount is preferably 5 parts by mass, more preferably 2 parts by mass, still more preferably 1 part by mass, still more preferably 0.7 parts by mass, especially preferably 0.4 parts by mass. When the mixing amount of the oxo acid of phosphorus or oxo acid salt of fluorinated phosphorus is within the above-mentioned range, for example, a film containing phosphorus in an amount sufficient with respect to the positive active material can be formed.

The aluminum coupling agent is a compound containing aluminum atoms, and having such a structure that the compound is capable of bonding to other compounds (positive active material etc.) through a solvolysis reaction or the like. By the aluminum coupling agent, a film containing aluminum atoms can be formed on the positive composite (positive active material). Examples of the aluminum coupling agent may include compounds represented by the general formula (1), with ethylacetoacetate aluminum diisopropoxide being preferable.

The lower limit of the mixing amount of the aluminum coupling agent in the positive composite paste may be, for example, 0.1 parts by mass, or 0.3 parts by mass, and is preferably 0.4 parts by mass, more preferably 0.5 parts by mass based on 100 parts by mass of the positive active material. Meanwhile, the upper limit of the mixing amount is preferably 5 parts by mass, more preferably 2 parts by mass, still more preferably 1 part by mass, still more preferably 0.7 parts by mass. When the mixing amount of the aluminum coupling agent is within the above-mentioned range, for example, a film containing aluminum in an amount sufficient with respect to the positive active material can be formed.

For the positive composite paste, an organic solvent is normally used as a dispersion medium. Examples of the organic solvent may include polar solvents such as N-methyl-2-pyrrolidone (NMP), acetone and ethanol, and nonpolar solvents such as xylene, toluene and cyclohexane, with polar solvents being preferable and NMP being more preferable.

The method for applying the positive composite paste is not particularly limited, and the positive composite paste can be applied by a known method such as roller coating, screen coating or spin coating.

In addition to the step of preparing a positive electrode as described above, the production method (α) may have, for example, the following steps. That is, the production method (α) may include, for example, the steps of preparing a negative electrode; preparing a nonaqueous electrolyte; forming an electrode assembly in which the positive electrode and the negative electrode are alternately superposed by laminating or winding the positive electrode and the negative electrode with a separator interposed between the electrodes; housing the positive electrode and the negative electrode (electrode assembly) in a battery container (case); and injecting the nonaqueous electrolyte into the battery container. The injection can be performed by a known method. A nonaqueous electrolyte secondary battery (nonaqueous electrolyte energy storage device) can be obtained by sealing an injection port after the injection.

<Method (β) for Producing Nonaqueous Electrolyte Energy Storage Device>

A method for producing a nonaqueous electrolyte energy storage device according to another embodiment of the present invention is a method (β) for producing a nonaqueous electrolyte energy storage device. The method includes preparing a positive electrode paste by mixing a positive active material, lithium difluorophosphate and a compound represented by the general formula (1). According to the production method (β), it is possible to obtain an energy storage device having a large initial discharge capacity, a high capacity retention ratio after a charge-discharge cycle, and high positive composite adhesion.

In the production method (β), it is preferable that the mixing amount of the lithium difluorophosphate is 0.3 parts by mass or more and 1 part by mass or less based on 100 parts by mass of the positive active material, and the mixing amount of the compound represented by the general formula (1) is preferably 0.3 parts by mass or more and 1 part by mass or less based on 100 parts by mass of the positive active material.

Since a more preferable mixing amount and other specific and suitable forms in the production method (β) are the same as the production method (α), the description of the production method (α) can be consulted.

Other Embodiments

The present invention is not limited to the above-described embodiments, and can be carried in aspects in which various changes and modifications are made in addition to the above-described aspects. For example, an intermediate layer is not required to be provided in the positive electrode or negative electrode. Incidentally, the positive composite is not required to form a distinct layer in the positive electrode of the nonaqueous electrolyte energy storage device. For example, the positive electrode may have a structure in which a positive composite is carried on a mesh-shaped positive electrode substrate.

In the above-described embodiment, an embodiment in which the nonaqueous electrolyte energy storage device is a nonaqueous electrolyte secondary battery has been mainly described, but the nonaqueous electrolyte energy storage device may be one other than a nonaqueous electrolyte secondary battery. Examples of the nonaqueous electrolyte energy storage devices other than a nonaqueous electrolyte secondary battery include capacitors (electric double layer capacitors and lithium ion capacitors).

FIG. 1 is a schematic view of a rectangular nonaqueous electrolyte energy storage device 1 (nonaqueous electrolyte secondary battery) as one embodiment of the nonaqueous electrolyte energy storage device according to the present invention. FIG. 1 is a view showing the inside of a container in a perspective manner. In the nonaqueous electrolyte energy storage device 1 shown in FIG. 1, an electrode assembly 2 is housed in a battery container 3 (case). The electrode assembly 2 is formed by winding a positive electrode and a negative electrode with a separator interposed between the electrodes, the positive electrode including a positive composite containing a positive active material, the negative electrode including a negative active material. The positive electrode is electrically connected to a positive electrode terminal 4 through a positive electrode lead 4', and the negative electrode is electrically connected to a negative electrode terminal 5 through a negative electrode lead 5'. Details of the positive composite are as described above. Incidentally, a nonaqueous electrolyte is injected in the battery container 3.

Figure 2:
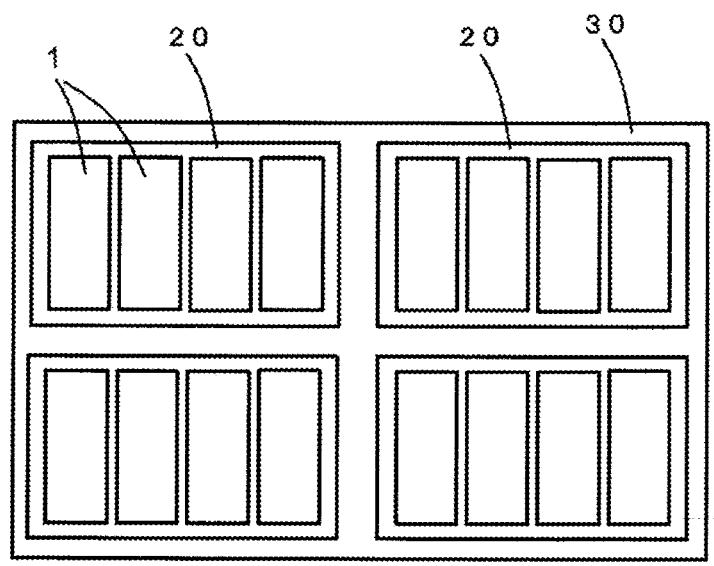
FIG. 2 is a schematic view showing an energy storage apparatus formed by assembling a plurality of nonaqueous electrolyte energy storage devices according to one embodiment of the present invention.

The configuration of the nonaqueous electrolyte energy storage device according to the present invention is not particularly limited, and examples of the nonaqueous electrolyte secondary battery include cylindrical batteries, prismatic batteries (rectangular batteries) and flat batteries. The present invention can also be implemented as an energy storage apparatus including a plurality of the nonaqueous electrolyte energy storage devices as described above. FIG. 2 shows one embodiment of an energy storage apparatus. In FIG. 2, an energy storage apparatus 30 includes a plurality of energy storage units 20. Each of the energy storage units 20 includes a plurality of the nonaqueous electrolyte energy storage devices 1. The energy storage apparatus 30 can be mounted as a power source for an automobile such as an electric vehicle (EV), a hybrid vehicle (HEV), a plug-in hybrid vehicle (PHEV), or the like.

EXAMPLES

Hereinafter, the present invention will be described further in detail by way of examples, but the present invention is not limited to the following examples.

Example 1

(Preparation of Positive Electrode)

With N-methyl pyrrolidone (NMP) used as a dispersion medium, $LiNi_{1/3}Co_{1/3}Mn_{1/3}O_2$ as a positive active material, acetylene black (AB) as a conductive agent and polyvinylidene fluoride (PVDF) as a binder were mixed at a mass ratio of 94:3:3 in terms of a solid content. To the resulting mixture, 0.7% by mass of ethylacetoacetate aluminum diisopropoxide (EAP: aluminum coupling agent represented by the following formula) and 0.3% by mass of phosphonic acid ($H_3PO_3$) based on the mass of the positive active material were added in this order, followed by further mixing to obtain a positive composite paste. The positive composite paste was applied to one surface of a 15 μm·thick aluminum foil as a positive electrode substrate, and dried at 100° C. to form a positive composite on the positive electrode substrate. The coating amount of the positive composite paste was 1.68 g/100 cm² in terms of a solid content. In this way, a positive electrode was obtained.

[Chemical Formula 7]

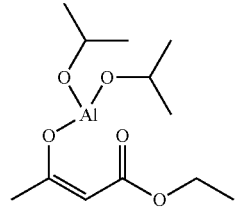

(Preparation of Negative Electrode)

Negative composite paste was prepared using graphite as a negative active material, styrene-butadiene rubber and carboxymethyl cellulose as a binder, and water as a dispersion medium. The mass ratio between the negative active material and the binder was 97:3. The negative composite paste was applied to one surface of a 10 μm-thick copper foil as a negative electrode substrate, and dried at 100° C. The coating amount of the negative composite was 1.05 g/100 cm² in terms of a solid content. In this way, a negative electrode was obtained.

(Preparation of Nonaqueous Electrolyte)

A nonaqueous electrolyte was prepared by dissolving lithium hexafluorophosphate ($LiPF_6$) at a concentration of 1.0 mol/l in a mixed solvent obtained by mixing EC and EMC at a volume ratio of 3:7.

(Preparation of Nonaqueous Electrolyte Energy Storage Device)

A polyolefin microporous film was used as a separator. An electrode assembly was prepared by superimposing the positive electrode and the negative electrode with the separator interposed between the electrodes. The electrode assembly was housed in a metal resin composite film case, the nonaqueous electrolyte was injected into the case, and the case was sealed by thermal welding to obtain a nonaqueous electrolyte energy storage device (secondary battery) of Example 1.

Examples 2 to 5 and Comparative Examples 1 to 4

A nonaqueous electrolyte energy storage device of each of Examples 2 to 5 and Comparative Examples 1 to 4 was obtained in the same manner as in Example 1, except that the types and amounts of additives used in preparation of the positive composite paste were as shown in Table 1. The symbol "–" in the column for additives in the table indicates that the relevant additive is not used. Incidentally, the term "EAP" refers to ethylacetoacetate aluminum diisopropoxide.

[Evaluation]
(Initial Formation)

For the resulting nonaqueous electrolyte energy storage device of each of Examples 1 to 5 and Comparative Examples 1 to 4, initial formation was performed under the following conditions. Constant current charge at 3 mA to 4.35 V was performed at 25° C., and constant voltage charge was then performed at 4.35 V. As a condition for termination of charge, charge was terminated at the time when the charge current reached 0.6 mA. After the charge, a quiescent period of 10 minutes was provided, and discharge was then performed at a constant current of 3 mA to 2.75 V at 25° C.

(Initial Capacity Confirmation Test)

For the resulting nonaqueous electrolyte energy storage device of each of Examples 1 to 5 and Comparative Examples 1 to 4, an initial capacity confirmation test was conducted under the following conditions after the initial formation. Constant current charge at 3 mA to 4.35 V was performed at 25° C., and constant voltage charge was then performed at 4.35 V. As a condition for termination of charge, charge was terminated at the time when the charge current reached 0.6 mA. After the charge, a quiescent period of 10 minutes was provided, and constant current discharge was then performed at 30 mA to 2.75 V at 25° C. In this way, the initial discharge capacity (initial capacity) was measured. The resulting initial capacities are shown in Table 1.

In this test condition, it can be determined that the energy storage device has a large initial capacity when it has an initial capacity of 155 mAh/g or more.

(XPS Measurement)

For the resulting nonaqueous electrolyte energy storage device of each of Examples 1 to 5 and Comparative Examples 1 to 4, XPS measurement was performed in accordance with the following procedure. The nonaqueous electrolyte energy storage device in an end-of-discharge state after the initial capacity confirmation test was disassembled in an argon atmosphere with a dew point of −60° C. or lower, and the positive electrode was taken out, cleaned with dimethyl carbonate, and then dried under reduced pressure at normal temperature. The resulting positive electrode was encapsulated in a transfer vessel in an argon atmosphere, and XPS measurement was performed on the surface of the positive composite of the positive electrode under the above-mentioned conditions. From the obtained spectrum, the peak position of P2p and the peak heights of O1s, P2p and Al2p were determined by the above-mentioned method. Peak height ratios (Al2p/P2p), (Al2p/O1s) and (P2p/O1s) were determined from the resulting peak heights. The resulting peak position of P2p and peak height ratios (Al2p/P2p), (Al2p/O1s) and (P2p/O1s) are shown in Table 1.

(Charge-Discharge Cycle Test: Capacity Retention Ratio)

For the nonaqueous electrolyte energy storage device of each of Examples 1 to 5 and Comparative Examples 1 to 4, a cycle test was conducted under the following conditions. The nonaqueous electrolyte energy storage device after the initial capacity confirmation test was stored in a thermostatic bath at 45° C. for 2 hours, constant current charge at 30 mA to 4.35 V was performed, and constant voltage (CCCV) charge was then performed at 4.35 V. As a condition for termination of charge, charge was terminated at the time when the charge current reached 0.6 mA. After the charge, a quiescent period of 10 minutes was provided, and constant current (CC) discharge was then performed at 30 mA to 2.75 V. With the discharge and charge step as one cycle, the cycle was repeated 100 times. Charge and discharge were performed and the quiescent period was provided in a thermostatic bath at 45° C.

For each nonaqueous electrolyte energy storage device after the charge-discharge cycle test, a capacity confirmation test after the cycle test was conducted in the same manner as in the initial capacity confirmation test. The ratio of the discharge capacity after the cycle test to the initial discharge capacity is shown as a capacity retention ratio (%) in Table 1.

In this test condition, it can be determined that the energy storage device has a high capacity retention ratio when it has a capacity retention ratio of 92% or more.

TABLE 1

| | Additives | | Nonaqueous electrolyte | P2p peak position eV | Peak height ratio | | | Initial capacity mAh/g | Capacity retention ratio % |
|---|---|---|---|---|---|---|---|---|---|
| | | | | | (Al2p/P2p) | (Al2p/O1s) | (P2p/O1s) | | |
| Example 1 | EAP: 0.7 wt % | $H_3PO_3$: 0.3 wt % | 1.0M $LiPF_6$/ EC:EMC = 3:7 | 133.7 | 0.29 | 0.024 | 0.083 | 160 | 94.5 |
| Example 2 | EAP: 0.5 wt % | $H_3PO_3$: 0.5 wt % | 1.0M $LiPF_6$/ EC:EMC = 3:7 | 133.6 | 0.17 | 0.022 | 0.129 | 158 | 93.9 |
| Example 3 | EAP: 0.5 wt % | $H_3PO_3$: 1.0 wt % | 1.0M $LiPF_6$/ EC:EMC = 3:7 | 133.6 | 0.17 | 0.063 | 0.371 | 156 | 93.7 |
| Example 4 | EAP: 0.7 wt % | $H_3PO_3$: 1.0 wt % | 1.0M $LiPF_6$/ EC:EMC = 3:7 | 133.6 | 0.19 | 0.092 | 0.484 | 156 | 93.4 |
| Example 5 | EAP: 1.0 wt % | $H_3PO_3$: 1.0 wt % | 1.0M $LiPF_6$/ EC:EMC = 3:7 | 133.5 | 0.20 | 0.076 | 0.380 | 156 | 92.7 |
| Comparative Example 1 | — | — | 1.0M $LiPF_6$/ EC:EMC = 3:7 | 134.8 | 0 | 0 | 0.050 | 161 | 87.2 |

TABLE 1-continued

|  | Additives | | Nonaqueous electrolyte | P2p peak position eV | Peak height ratio | | | Initial capacity mAh/g | Capacity retention ratio % |
| --- | --- | --- | --- | --- | --- | --- | --- | --- | --- |
|  |  |  |  |  | (Al2p/P2p) | (Al2p/O1s) | (P2p/O1s) |  |  |
| Comparative Example 2 | EAP: 1.0 wt % | — | 1.0M LiPF$_6$/ EC:EMC = 3:7 | 135.1 | 1.32 | 0.097 | 0.074 | 160 | 91.1 |
| Comparative Example 3 | — | H$_3$PO$_3$: 1.0 wt % | 1.0M LiPF$_6$/ EC:EMC = 3:7 | 133.1 | 0 | 0 | 0.328 | 153 | 92.7 |
| Comparative Example 4 | EAP: 0.3 wt % | H$_3$PO$_3$: 1.0 wt % | 1.0M LiPF$_6$/ EC:EMC = 3:7 | 133.5 | 0.07 | 0.039 | 0.557 | 153 | 92.4 |

As shown in Table 1, it is apparent that the nonaqueous electrolyte energy storage device of each of Examples 1 to 5 has a large initial capacity and a high capacity retention ratio. On the other hand, in Comparative Example 1 where an additive is not used, the peak position of P2p does not appear at 134.7 eV or less, and the capacity retention ratio is low. In Comparative Example 2 where only an aluminum coupling agent is added, and phosphonic acid is not added, the peak position of P2p does not appear at 134.7 eV or less, and the capacity retention ratio is not so high. In Comparative Example 3 where only phosphonic acid is added, and an aluminum coupling agent is not added, and Comparative Example 4 where phosphonic acid and an aluminum coupling agent are added, but the addition amount of the aluminum coupling agent is small, the peak height ratio (Al2p/P2p) is less than 0.1. It is apparent that in Comparative Example 3 and Comparative Example 4, the capacity retention ratio is high, but the initial capacity is much lower than that in Comparative Example 1.

Examples 6 to 9 and Comparative Examples 5 to 9

A nonaqueous electrolyte energy storage device of each of Examples 6 to 9 and Comparative Examples 5 to 9 was obtained in the same manner as in Example 1, except that the types and amounts of additives used in preparation of the positive composite paste, and the composition of the nonaqueous electrolyte were as shown in Table 2. The symbol "–" in the column for additives in the table indicates that the relevant additive is not used. The concentration of LiPO$_2$F$_2$ in the nonaqueous electrolyte in each of Comparative Examples 8 and 9 was 1% by mass based on the mass of the positive active material in the energy storage device.

[Evaluation]
(Peeling Strength Test)

A peeling strength test was conducted in the following manner in accordance with the 180° peeling test described in JIS K 6854-2:1999. The positive electrode used for preparation of the nonaqueous electrolyte energy storage device of each of Example 7 and Comparative Examples 5 to 7 was cut into a rectangle of 3 cm (long)×4 cm (wide) to prepare a peeling strength test sample, and the sample was fixed in a jig of a peeling test apparatus. A mending tape (width: 15 mm) manufactured by 3M Company was attached to the sample, the attached tape was then peeled off, and a force required for peeling off the tape was measured by a load measurement instrument. The peeling speed was 100 mm/min. MH-100AC manufactured by IMADA CO., LTD. was used as the peeling test apparatus, and Digital Force Gauge DS-20N manufactured by IMADA CO., LTD. was used as the load measurement instrument. The measured values are shown in Table 2.

(Initial Formation)

For the resulting nonaqueous electrolyte energy storage device of each of Examples 6 to 9 and Comparative Examples 5 to 9, initial formation was performed in the same manner as in Example 1 etc.

(Initial Capacity Confirmation Test)

For the resulting nonaqueous electrolyte energy storage device of each of Examples 6 to 9 and Comparative Examples 5 to 9, an initial capacity confirmation test was conducted under the following conditions after the initial formation. Constant current charge at 3 mA to 4.35 V was performed at 25° C., and constant voltage charge was then performed at 4.35 V. As a condition for termination of charge, charge was terminated at the time when the charge current reached 0.6 mA. After the charge, a quiescent period of 10 minutes was provided, and discharge was then performed at a constant current of 30 mA to 2.75 V at 25° C. From the resulting initial capacity, the discharge capacity and energy density per mass of the positive active material were calculated, and defined as an initial capacity and an initial energy density, respectively. The resulting initial capacities are shown in Table 2.

(XPS Measurement)

For the resulting nonaqueous electrolyte energy storage device of each of Examples 6 to 9 and Comparative Examples 5 to 9 in an end-of-discharge state after the initial capacity confirmation test, XPS measurement was performed in the same manner as in Example 1 etc. The resulting peak position of P2p and peak height ratios (Al2p/P2p), (Al2p/O1s) and (P2p/O1s) are shown in Table 2.

Further, as a reference example, the XPS spectrum of each of lithium difluorophosphate (LiPO$_2$F$_2$), lithium phosphate (Li$_3$PO$_4$) and phosphonic acid (H$_3$PO$_3$) was measured. A sample was prepared by attaching a powder of each of the compounds to one surface of a double-sided adhesive carbon tape, and bonding the other surface to a sample table, and XPS measurement was performed in accordance with the above-mentioned method. The resulting peak positions of P2p are shown in Table 3.

(Charge-Discharge Cycle Test: Capacity Retention Ratio and Energy Density Retention Ratio)
<Cycle Test>

For the nonaqueous electrolyte energy storage device of each of Examples 6 to 9 and Comparative Examples 5 to 9, a cycle test was conducted under the following conditions. The nonaqueous electrolyte energy storage device after the initial capacity confirmation test was stored in a thermostatic bath at 45° C. for 2 hours, constant current charge at 30 mA to 4.35 V was performed, and constant voltage (CCCV) charge was then performed at 4.35 V. As a condition for termination of charge, charge was terminated at the time when the charge current reached 0.15 mA. After the charge, a quiescent period of 10 minutes was provided, and constant current (CC) discharge was then performed at 30 mA to 2.75

V. With the discharge and charge step as one cycle, the cycle was repeated 100 times. Charge and discharge were performed and the quiescent period was provided in a thermostatic bath at 45° C.

For each nonaqueous electrolyte energy storage device after the charge-discharge cycle test, a capacity confirmation test after the cycle test was conducted in the same manner as in the initial capacity confirmation test. The ratio of the energy density per mass of the positive active material after the cycle to the initial energy density is defined as an energy density retention ratio (%), and the ratio of the discharge capacity after the cycle test to the initial discharge capacity is defined as a capacity retention ratio (%). The energy density retention ratio and the capacity retention ratio are shown in Table 2. For the nonaqueous electrolyte energy storage device of Comparative Example 5, the test was ended after 50 cycles because the capacity was markedly reduced during the cycle test.

In this test condition, it can be determined that the energy storage device has a high capacity retention ratio when it has a capacity retention ratio of 91.8% or more.

in Al2p in the XPS spectrum. In the nonaqueous electrolyte energy storage device of Comparative Example 5 where the positive composite layer did not contain EAP and $LiPO_2F_2$, the capacity was considerably reduced after the cycle test. In the XPS spectrum of the positive electrode of the battery of Comparative Example 5, the peak position of P2p was observed at 134.8 eV. The positive composite layers in Comparative Example 5 where the positive composite did not contain EAP and $LiPO_2F_2$ and Comparative Example 7 where the positive composite layer contained only $LiPO_2F_2$ had insufficient adhesion. In particular, the positive composite layer of Comparative Example 7 was not uniformly bonded with the peeling strength varied depending on a site. The peak position of P2p was at 134.4 eV in the XPS spectrum of the positive electrode in Comparative Example 7. In the nonaqueous electrolyte energy storage device of Comparative Example 8 where the positive composite layer did not contain EAP, and the nonaqueous electrolyte contained $LiPO_2F_2$, the capacity was considerably reduced after the cycle test. In the nonaqueous electrolyte energy storage devices of Comparative Example 6 and Comparative

TABLE 2

| | Additives | | Nonaqueous electrolyte | P2p peak position eV | Peak height ratio | | | Peeling strength N/m | Energy density retention ratio % | Initial capacity mAh/g | Capacity retention ratio % |
|---|---|---|---|---|---|---|---|---|---|---|---|
| | | | | | (Al2p/P2p) | (Al2p/O1s) | (P2p/O1s) | | | | |
| Example 6 | EAP: 0.7 wt % | $LiPO_2F_2$: 0.3 wt % | 1.0M $LiPF_6$/ EC:EMC = 3:7 | 134.3 | 0.67 | 0.062 | 0.092 | — | 93.5 | 162 | 95.1 |
| Example 7 | EAP: 0.5 wt % | $LiPO_2F_2$: 0.5 wt % | 1.0M $LiPF_6$/ EC:EMC = 3:7 | 134.5 | 0.46 | 0.049 | 0.107 | 355 | 92.5 | 161 | 93.8 |
| Example 8 | EAP: 0.3 wt % | $LiPO_2F_2$: 0.7 wt % | 1.0M $LiPF_6$/ EC:EMC = 3:7 | 134.3 | 0.21 | 0.026 | 0.122 | — | 93.0 | 161 | 93.6 |
| Example 9 | EAP: 1.0 wt % | $LiPO_2F_2$: 1.0 wt % | 1.0M $LiPF_6$/ EC:EMC = 3:7 | 134.7 | 0.71 | 0.123 | 0.174 | — | 91.3 | 160 | 91.8 |
| Comparative Example 5 | — | — | 1.0M $LiPF_6$/ EC:EMC = 3:7 | 134.8 | 0 | 0 | 0.050 | 232 | 58.7* | 161 | 62.5* |
| Comparative Example 6 | EAP: 1.0 wt % | — | 1.0M $LiPF_6$/ EC:EMC = 3:7 | 135.3 | 1.05 | 0.084 | 0.080 | 408 | 89.9 | 160 | 91.0 |
| Comparative Example 7 | — | $LiPO_2F_2$: 1.0 wt % | 1.0M $LiPF_6$/ EC:EMC = 3:7 | 134.4 | 0 | 0 | 0.126 | 221 | 91.4 | 161 | 91.6 |
| Comparative Example 8 | — | — | 1.0M $LiPF_6$/ EC:EMC = 3:7 + $LiPO_2F_2$ | 134.0 | 0 | 0 | 0.045 | — | 63.5 | 163 | 60.6 |
| Comparative Example 9 | EAP: 1.0 wt % | — | 1.0M $LiPF_6$/ EC:EMC = 3:7 + $LiPO_2F_2$ | 135.0 | 0.74 | 0.104 | 0.140 | — | 89.7 | 160 | 90.1 |

*The energy density retention ratio and discharge capacity retention ratio in Comparative Example 5 are values at the end of 50 cycles.

TABLE 3

| Phosphorus compound | P2p peak position/eV |
|---|---|
| $LiPO_2F_2$ | 135.5 |
| $Li_3PO_4$ | 133.3 |
| $H_3PO_3$ | 134.0 |

As shown in Table 2, the nonaqueous electrolyte energy storage devices of Examples 6 to 9 in which the positive composite layer contained 0.3 to 1.0% by mass of EAP and 0.3 to 1.0% by mass of $LiPO_2F_2$ based on the mass of the positive active material were excellent in initial discharge capacity and capacity retention ratio. Incidentally, the nonaqueous electrolyte energy storage device of Example 7, which contained 0.5% by mass of EAP and 0.5% by mass of $LiPO_2F_2$, the positive composite layer had high peeling strength. In these examples, as shown in Table 2, the peak position of P2p was at 134.3 to 134.7 eV in the XPS spectrum of the positive electrode, and a peak was observed Example 9 where the positive composite layer contained only EAP, a favorable capacity retention ratio was not exhibited after the cycle test irrespective of whether or not the nonaqueous electrolyte contained $LiPO_2F_2$, and the peak position of P2p was at 135.0 eV or more in the XPS spectrum of the positive electrode.

As shown in Table 3, the peak positions of P2p in the XPS spectra of $LiPO_2F_2$, $Li_3PO_4$ and $H_3PO_3$ were at 135.5 eV, 133.3 eV and 134.0 eV, respectively. Incidentally, when $Li_3PO_4$ was mixed in the positive composite layer, an effect of improving cycle performance was not obtained. These results suggest that when $Li_3PO_4$ was mixed in the positive composite layer, a film having a peak position of P2p at 134.3 to 134.7 eV in the XPS spectrum was not formed. That is, the nonaqueous electrolyte energy storage device including a positive electrode having a peak position of P2p at 134.3 to 134.7 eV in the XPS spectrum in the vicinity of a surface according to each of Examples 6 to 9 can be obtained by adding $LiPO_2F_2$ to the positive composite layer.

From these results, a mechanism in which the effect was exhibited in Examples 6 to 9 is considered as follows. By mixing EAP and LiPO$_2$F$_2$ in the positive composite layer, a film containing Al and a phosphorus compound having a peak position of P2p at 134.3 to 134.7 eV in the XPS spectrum is formed on the surface of the positive active material. Presence of the film improves the adhesion of the positive composite layer, so that a nonaqueous electrolyte energy storage device having excellent cycle performance is obtained. In the nonaqueous electrolyte energy storage devices of Comparative Examples 5, 6, 8 and 9 where the peak position of P2p was not at 134.3 to 134.7 eV in the XPS spectrum, the capacity was considerably reduced after the cycle test, and even the nonaqueous electrolyte energy storage devices of Comparative Examples 6 and 9 in which the film on the surface of the positive active material contained Al did not have sufficient cycle performance. This may be because reduction of the capacity after the cycle test is suppressed by the phosphorus compound having a peak position of P2p in the XPS spectrum is within the above-mentioned range. On the other hand, in the nonaqueous electrolyte energy storage device of Comparative Example 7 where only LiPO$_2$F$_2$ was mixed in the positive composite layer, the peak position of P2p was in the above-mentioned range in the XPS spectrum, cycle performance was higher than cycle performance in other comparative examples but was insufficient, and adhesion was insufficient. That is, in the nonaqueous electrolyte energy storage devices of Examples 6 to 9, addition of not only LiPO$_2$F$_2$ but also EAP to the positive composite layer improved the adhesion of the positive composite layer, so that it could obtain a nonaqueous electrolyte energy storage device excellent in initial discharge capacity and cycle performance.

INDUSTRIAL APPLICABILITY

The present invention can be applied to nonaqueous electrolyte energy storage devices to be used as power sources for electronic devices such as personal computers and communication terminals, automobiles and the like.

DESCRIPTION OF REFERENCE SIGNS

1: Nonaqueous electrolyte energy storage device
2: Electrode assembly
3: Battery container
4: Positive electrode terminal
4': Positive electrode lead
5: Negative electrode terminal
5': Negative electrode lead
20: Energy storage unit
30: Energy storage apparatus

The invention claimed is:

1. A nonaqueous electrolyte energy storage device comprising a positive electrode containing a positive composite, the positive composite containing a positive active material, a phosphorus atom and an aluminum atom,
wherein in a spectrum of the positive composite as measured by X-ray photoelectron spectroscopy, a peak position of P2p is at 134.7 eV or less, and a peak height ratio of Al2p to P2p (Al2p/P2p) is 0.1 or more and 0.5 or less, and the spectrum is after leveling processing by removing a background using a straight-line method.

2. The nonaqueous electrolyte energy storage device according to claim 1,
wherein the positive active material contains a metal oxide, and
in the spectrum of the positive composite, a peak height ratio of Al2p to O1s (Al2p/O1s) is 0.01 or more.

3. The nonaqueous electrolyte energy storage device according to claim 1, wherein in the spectrum of the positive composite, the peak height ratio of Al2p to P2p (Al2p/P2p) is 0.3 or less.

4. The nonaqueous electrolyte energy storage device according to claim 1,
wherein the positive composite comprises:
the positive active material;
0.3 parts by mass or more and 1 part by mass or less of an oxo acid of phosphorus or an oxo acid salt of fluorinated phosphorus based on 100 parts by mass of the positive active material; and
0.4 parts by mass or more and 1 part by mass or less of an aluminum coupling agent based on 100 parts by mass of the positive active material.

5. The nonaqueous electrolyte energy storage device according to claim 4,
wherein the aluminum coupling agent is selected from the group consisting of aluminum alkoxides and aluminum chelates.

6. The nonaqueous electrolyte energy storage device according to claim 4,
wherein the aluminum coupling agent is selected from the group consisting of ethylacetoacetate aluminum diethoxide, ethylacetoacetate aluminum diisopropoxide, ethylacetoacetate aluminum di(tert-butoxide), acetylacetonate aluminum diisopropoxide, aluminum trisacetylacetonate, aluminum isopropoxide, aluminum acetylacetonate bis(ethylacetoacetate) and aluminum trisethylacetoacetate.

7. The nonaqueous electrolyte energy storage device according to claim 1,
wherein the positive composite comprises:
the positive active material;
0.3 parts by mass or more and 1 part by mass or less of an oxo acid of phosphorus or an oxo acid salt of fluorinated phosphorus based on 100 parts by mass of the positive active material; and
0.4 parts by mass or more and 1 part by mass or less of an aluminum coupling agent based on 100 parts by mass of the positive active material, the aluminum coupling agent represented by general formula (1) below:

(1)

wherein R$^1$ to R$^3$ are each independently a hydrocarbon group having 1 to 9 carbon atoms, or a group represented by general formula (2) below:

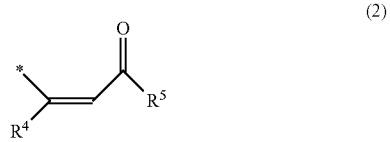
(2)

wherein R$^4$ and R$^5$ are each independently an alkyl group having 1 to 18 carbon atoms, or an alkoxy group having 1 to 18 carbon atoms.

8. The nonaqueous electrolyte energy storage device according to claim 1,
wherein the positive composite comprises:
the positive active material;
0.3 parts by mass or more and 1 part by mass or less of an oxo acid of phosphorus or an oxo acid salt of fluorinated phosphorus based on 100 parts by mass of the positive active material; and
0.4 parts by mass or more and 1 part by mass or less of ethylacetoacetate aluminum diisopropoxide based on 100 parts by mass of the positive active material.

9. The nonaqueous electrolyte energy storage device according to claim 1,
wherein the positive composite comprises:
the positive active material;
0.3 parts by mass or more and 1 part by mass or less of an oxo acid of phosphorus based on 100 parts by mass of the positive active material; and
0.4 parts by mass or more and 1 part by mass or less of ethylacetoacetate aluminum diisopropoxide based on 100 parts by mass of the positive active material.

10. A method for producing the nonaqueous electrolyte energy storage device according to claim 1, the method comprising preparing a positive composite paste by mixing the positive active material, an oxo acid of phosphorus or an oxo acid salt of fluorinated phosphorus, and an aluminum coupling agent.

11. The method for producing the nonaqueous electrolyte energy storage device according to claim 10, wherein a mixing amount of the aluminum coupling agent based on 100 parts by mass of the positive active material is 0.4 parts by mass or more.

12. A method for producing the nonaqueous electrolyte energy storage device according to claim 1, the method comprising preparing a positive electrode paste by mixing the positive active material, lithium difluorophosphate and a compound represented by general formula (1) below:

[Chemical Formula 1]

(1)

wherein $R^1$ to $R^3$ are each independently a hydrocarbon group having 1 to 9 carbon atoms, or a group represented by general formula (2) below:

[Chemical Formula 2]

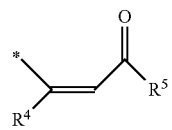

(2)

wherein $R^4$ and $R^5$ are each independently an alkyl group having 1 to 18 carbon atoms, or an alkoxy group having 1 to 18 carbon atoms.

13. The method for producing a nonaqueous electrolyte energy storage device according to claim 12,
wherein a mixing amount of the lithium difluorophosphate is 0.3 parts by mass or more and 1 part by mass or less based on 100 parts by mass of the positive active material, and
a mixing amount of the compound represented by the general formula (1) is preferably 0.3 parts by mass or more and 1 part by mass or less based on 100 parts by mass of the positive active material.

14. A nonaqueous electrolyte energy storage device comprising a positive electrode containing a positive electrode substrate and a positive composite,
wherein the positive composite comprises:
a positive active material;
0.3 parts by mass or more and 1 part by mass or less of an oxo acid of phosphorus or an oxo acid salt of fluorinated phosphorus based on 100 parts by mass of the positive active material; and
0.4 parts by mass or more and 1 part by mass or less of an aluminum coupling agent based on 100 parts by mass of the positive active material, the aluminum coupling agent represented by general formula (1) below:

(1)

wherein $R^1$ to $R^3$ are each independently a hydrocarbon group having 1 to 9 carbon atoms, or a group represented by general formula (2) below:

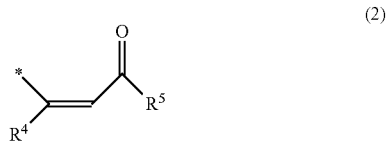

(2)

wherein $R^4$ and $R^5$ are each independently an alkyl group having 1 to 18 carbon atoms, or an alkoxy group having 1 to 18 carbon atoms; and
in a spectrum of the positive composite as measured by X-ray photoelectron spectroscopy, a peak position of P2p is at 134.7 eV or less, and a peak height ratio of Al2p to P2p (Al2p/P2p) is 0.1 or more and 0.5 or less, and the spectrum is after leveling processing by removing a background using a straight-line method.

15. The nonaqueous electrolyte energy storage device according to claim 14,
wherein the aluminum coupling agent is selected from the group consisting of aluminum alkoxides and aluminum chelates.

16. The nonaqueous electrolyte energy storage device according to claim 14,
wherein the aluminum coupling agent is selected from the group consisting of ethylacetoacetate aluminum diethoxide, ethylacetoacetate aluminum diisopropoxide, ethylacetoacetate aluminum di(tert-butoxide), acetylacetonate aluminum diisopropoxide, aluminum trisacetylacetonate, aluminum isopropoxide, aluminum acetylacetonate bis(ethylacetoacetate) and aluminum trisethylacetoacetate.

* * * * *